United States Patent [19]

Heinberg

[11] 4,247,995

[45] Feb. 3, 1981

[54] LANGUAGE TEACHING METHOD AND APPARATUS

[76] Inventor: Paul Heinberg, 1530 Ahuawa Loop, Honolulu, Hi. 96816

[21] Appl. No.: 56,075

[22] Filed: Jul. 9, 1979

[51] Int. Cl.³ .............................................. G09B 19/04
[52] U.S. Cl. .................................................... 434/185
[58] Field of Search .................. 35/35 R, 35 C, 35 E, 35/35 J

[56] References Cited

U.S. PATENT DOCUMENTS

| | | |
|---|---|---|
| 1,271,856 | 7/1918 | Cook . |
| 3,081,560 | 3/1963 | Agud . |
| 3,271,884 | 9/1966 | Roberson . |
| 3,464,124 | 9/1969 | Lynd . |
| 3,670,427 | 6/1972 | Stolpen . |
| 3,715,812 | 2/1973 | Novak . |
| 3,823,491 | 7/1974 | Lehmann . |
| 3,885,326 | 5/1975 | Robinson . |
| 4,007,548 | 2/1977 | Cytanovich . |
| 4,030,211 | 6/1977 | McGinley . |
| 4,067,122 | 1/1978 | Fernandez . |
| 4,082,279 | 4/1978 | McFadden . |
| 4,112,595 | 9/1978 | Fernandez . |
| 4,115,932 | 9/1978 | Charlesworth . |

OTHER PUBLICATIONS

Morton Cooper, "Approaches to Vocal Rehabilitation," Chapter 3 only, Chas. C. Thomas, 1977.

*Primary Examiner*—Harland S. Skogquist
*Attorney, Agent, or Firm*—Schuyler, Banner, Birch, McKie & Beckett

[57] ABSTRACT

A method and apparatus of language communication instruction is disclosed which involves rotated peer dyads wherein instruction is carried out by pair discrimination and the students rotate momentarily and continuously among the three communication roles of producer of stimuli, respondent to stimuli and evaluator of stimuli and responses. Each given response will identify error in either the stimulus or the response without attributing the error to either partner of each dyad.

13 Claims, 8 Drawing Figures

| 3P | | | 4P | | |
|---|---|---|---|---|---|
| SEE | SAY | RESPOND | SEE | SAY | RESPOND |
| b<br>bē<br>ēb<br>bĭ<br>b | | | bḗ bē<br>bēbḗ<br>bēbĭ́<br>bĭbḗ<br>bĭ́ bĭ | | |
| ĭb<br>bĭb<br>bēb<br>b<br>bĭb | | | bḗ bḗ<br>bḗ bē<br>bḗ bĭ<br>bĭbēb́<br>bḗ bĭb | | |
| | A) b<br>B) bē<br>B) bĭb<br>A) ēb<br>B) bĭb | | | | B) bḗ bē<br>B) bḗ bḗ<br>B) bĭ́ bĭ<br>A) bḗ beb<br>A) bēbĭb́ |
| | | A) ĭb<br>A) ēb<br>A) bĭ<br>A) bĭb<br>B) bē | | | A) bēbḗ<br>B) bḗ bĭ<br>A) bĭ́ beb<br>A) bḗ beb<br>B) bḗ bĭb |

FIG.1a

|  | 3P |  |  | 4P |  |
|---|---|---|---|---|---|
| SEE | SAY | RESPOND | SEE | SAY | RESPOND |
| b<br>bē<br>ēb<br>bĭ<br>b |  |  | be̅ ́be̅<br>be̅be̅ ́<br>be̅bĭ ́<br>bĭbe̅ ́<br>bĭ ́bĭ |  |  |
| ĭb<br>bĭb<br>be̅b<br>b<br>bĭb |  |  | be̅ ́be̅ ́<br>be̅ ́be̅<br>be̅ ́bĭ<br>bĭbe̅b ́<br>be̅ ́bĭb |  |  |
|  |  | A) b<br>B) be̅<br>A) be̅b<br>B) ĭb<br>B) bĭb |  |  | B) be̅ ́be̅<br>A) be̅be̅ ́<br>B) bĭ ́bĭ<br>B) bĭ ́beb<br>B) be̅ ́bĭb |
|  | B) b<br>A) e̅b<br>B) be̅<br>A) bĭb<br>A) be̅b |  |  | A) be̅be̅ ́<br>A) be̅ ́be̅<br>A) bĭ ́beb<br>B) be̅ ́bĭb<br>B) be̅ ́bĭb ́ |  |

FIG.1b

| | 19G | | | 20G | |
|---|---|---|---|---|---|
| SEE | SAY | RESPOND | SEE | SAY | RESPOND |
| (ou) ow<br>(kou) cow<br>(toun) town<br>(kount) count<br>(found) found | | | (bŭs) bus<br>(bŭz) buzz<br>(kŭps) cups<br>(kŭbz) cubs<br>(bĕts) bets | | |
| (koin) coin<br>(moist) moist<br>(toi) toy<br>(boi) boy<br>(ploi) ploy | | | (bĕdz) beds<br>(băks) backs<br>(băgz) bags<br>(sāfs) safes<br>(sāvz) saves | | |
| | | B) (joi)<br>A) (noun)<br>A) (shout)<br>A) (soi)<br>B) (mouth) | | A) slabs<br>B) grates<br>A) caves<br>B) tags<br>A) sleeps | |
| | A) mound<br>A) loud<br>B) join<br>A) south<br>B) cloy | | | | B) (grādz)<br>A) (slăbz)<br>A) (tăks)<br>B) (wāvz)<br>A) (nēdz) |

FIG. 2a

|  | 19G |  |  | 20G |  |
|---|---|---|---|---|---|
| SEE | SAY | RESPOND | SEE | SAY | RESPOND |
| (ou) ow<br>(kou) cow<br>(toun) town<br>(kount) count<br>(found) found | | | (bŭs) bus<br>(bŭz) buzz<br>(kŭps) cups<br>(kŭbz) cubs<br>(bĕts) bets | | |
| (koin) coin<br>(moist) moist<br>(toi) toy<br>(boi) boy<br>(ploi) ploy | | | (bĕdz) beds<br>(băks) backs<br>(băgz) bags<br>(sāfs) safes<br>(sāvz) saves | | |
| | B) joy<br>A) noun<br>A) shout<br>B) sow<br>B) mouth | | | | A) (slăbz)<br>B) (grāts)<br>A) (kāvz)<br>A) (tăks)<br>A) (slēps) |
| | | B) (noun)<br>A) (loud)<br>A) (joi)<br>B) (sou)<br>B) (kloi) | | B) grades<br>B) slaps<br>A) tacks<br>B) waves<br>A) needs | |

FIG. 2b

|  | 17D | | 18D | |
| --- | --- | --- | --- | --- |
| SEE | | | SAY | RESPOND |
| up (ŭp)<br>down (doun)<br>left ←<br>right →<br>upper left (ŭ´pẽr) ↖ | | | B) upper left<br>B) up<br>A) lower right<br>A) upper right<br>B) lower left | |
| lower left (lō´ẽr) ↙<br>   SAME: A) upper right  A) ↗<br>          B) lower right  B) ↘<br>NOT SAME: A) upper right  B) →<br>            B) lower right  A) ↗ | | | | A) ↘<br>B) ↑<br>B) ↖<br>A) ←<br>B) ↖ |
| SAY | | RESPOND | SAY | RESPOND |
| B) upper right<br>B) lower left<br>A) up<br>A) lower right<br>A) down | | | B) down<br>A) right<br>B) lower left<br>A) upper right<br>B) lower right | |
| | | A) ↑<br>B) ↖<br>B) ←<br>A) ↗<br>B) ↓ | | A) ↑<br>A) ←<br>B) ↘<br>B) ←<br>B) ↓ |

| SEE | SAY | RESPOND |
|---|---|---|
| up (ŭp)<br>down (doun)<br>left ←<br>right →<br>upper left (ŭ′ per) ↖ | | B) ↖<br>B) ↑<br>B) ↙<br>A) ↗<br>B) ↙ |
| lower left (lō′ er) ↙<br>SAME: A) upper right  A) ↗<br>       B) lower right  B) ↘<br>NOT SAME: A) upper right  B) →<br>          B) lower right  A) ↗ | A) lower right<br>A) down<br>B) upper left<br>A) left<br>A) lower left | |

| SAY | RESPOND | SAY | RESPOND |
|---|---|---|---|
| | B) ↗<br>B) ↙<br>A) ↑<br>B) ↙<br>A) ↓ | | B) ↓<br>A) →<br>B) ↙<br>B) ↖<br>B) ↘ |
| A) up<br>A) lower left<br>A) upper left<br>A) upper right<br>B) down | | A) up<br>A) left<br>B) lower right<br>A) right<br>B) down | |

FIG. 3b

|  1C | 2C |
|---|---|
| SEE | RESPOND |
| SAY: I want to talk to you.<br>(serious)<br>(unconcerned)<br>(joking)<br>(unconcerned) | A) (unconcerned)<br>A) (joking)<br>A) (serious)<br>B) (joking)<br>A) (unconcerned) |
| SEE | SAY: I want to see you now. |
| SAY: I want to see you now.<br>(joking)<br>(serious)<br>(unconcerned)<br>(joking) | B) (joking)<br>A) (serious)<br>B) (joking)<br>B) (unconcerned)<br>A) (serious) |
| RESPOND | RESPOND |
| A) (serious)<br>B) (joking)<br>B) (unconcerned)<br>B) (serious)<br>B) (joking) | A) (joking)<br>B) (joking)<br>B) (serious)<br>A) (unconcerned)<br>B) (serious) |
| SAY: I want to talk to you. | SAY: I want to talk to you. |
| B) (joking)<br>B) (serious)<br>A) (unconcerned)<br>A) (serious)<br>A) (unconcerned) | A) (unconcerned)<br>A) (serious)<br>A) (serious)<br>B) (joking)<br>B) (unconcerned) |

FIG. 4a

| 1C | 2C |
|---|---|
| SEE | SAY: I want to talk to you. |
| SAY: I want to talk to you.<br>(serious)<br>(unconcerned)<br>(joking)<br>(unconcerned) | A) (unconcerned)<br>B) (serious)<br>B) (joking)<br>B) (joking)<br>A) (unconcerned) |
| SEE | RESPOND |
| SAY: I want to see you now.<br>(joking)<br>(serious)<br>(unconcerned)<br>(joking) | B) (joking)<br>B) (unconcerned)<br>B) (joking)<br>A) (serious)<br>B) (joking) |
| SAY: I want to see you now. | SAY: I want to see you now. |
| A) (serious)<br>B) (joking)<br>A) (serious)<br>A) (unconcerned)<br>B) (joking) | B) (serious)<br>B) (joking)<br>B) (serious)<br>A) (unconcerned)<br>A) (joking) |
| RESPOND | RESPOND |
| B) (joking)<br>A) (unconcerned)<br>B) (joking)<br>A) (serious)<br>A) (unconcerned) | B) (serious)<br>B) (joking)<br>B) (unconcerned)<br>B) (joking)<br>B) (unconcerned) |

FIG. 4b

LANGUAGE TEACHING METHOD AND APPARATUS

BACKGROUND OF THE INVENTION

1. Field of the Invention

This invention relates to methods and apparatus for teaching language communication.

2. Description of the Prior Art

Conventional methodologies of language instruction usually involve a teacher and student relationship known as the "fixed superordinate-subordinate dyad," that is, an instructional pair with the student in the subordinate position. The student is usually fixed in the communication role of respondent, while the superordinate teacher rotates momentarily and continuously amoung the roles of producer of stimuli and evaluator of the student's responses to the stimuli. The basic mental operation is usually pair association, wherein the basic stimulus is one of any group of items. The basic response is selection of that item from a group of items that is most closely related to or associated with the stimulus item.

The components of conventional language instruction are neither fixed nor concertedly agreed upon. However, it can be said that the basic components are frequently referred to as being reading, writing, speaking, listening and vocabulary, with the first two generally being paired together, and the second two also being paired together. That is, students tend to respond orally to the teacher's oral stimuli, and in writing to the teacher's written stimuli when students individually respond. Vocabulary study tends to occur within the other four components, but it is generally presented, at least to some extent, as a separate component. When there is such formal instruction in vocabulary, it is generally achieved by a verbal definition of the term's usage in a given context, especially for terms that cannot be easily pictorially defined. It is only through exposure to words in various contexts that the student infers which one of a group of synonyms is more appropriate for a particular context, and formal instruction is not generally focused on producing such inferences.

In this type of instruction, because no single skill is taught independently to a high criterion level before an attempt is made to provide another skill, error identification is complex and covert. The services of a professional are usually required both to detect errors and to identify the source of each. It should be noted that this conventional teaching of various language skills concurrently is not arbitrary, but necessary, in view of the limitations of the fixed communication role.

Because conventional methodologies usually involve student interaction with a very limited number of others, communication idiosyncrasies are developed and reinforced, leading to speech which is not well understood by native speakers of the target language. In addition, a student's knowledge of the correctness of his responses is achieved always from the instructor and only on those occasions when that instructor can attend to responses from that student.

The phenomena with which any student must cope during conventional instruction are selected by the professional, and, even if the student is instructed to proceed undeviatingly through a workbook, the grouping and sequencing of phenomena are not readily apparent to most students, and the learning task on any page is far from clear. What material any student is to be tested on, and the precise nature of such testing, are seldom revealed to any student prior to that student being tested. Hence, in conventional instruction the phenomena presented to the student to respond to are seldom anticipated, and what constitutes correctness of response tends to be quite vague.

A number of language teaching methods and apparatus have been devised for use by students arranged in dyads where each partner of a dyad is a student, rather than one being a teacher or professional. However, most of these operate on the same basic principles as the other conventional language instruction methodologies discussed above, in that the students, while their roles may rotate, are nevertheless placed in superordinate-subordinate relationship. These methods suffer many of the same disadvantages as those of the above discussed conventional methodologies.

SUMMARY OF THE INVENTION

It is therefore an object of the present invention to obviate the above noted shortcomings of the prior art by providing a language teaching method and apparatus which will enable persons to communicate effectively in the target language with a variety of others, especially with native speakers of the target language.

Another object of the invention is to provide such a method and apparatus which will accomplish a given level of instruction in less time than can be accomplished by conventional methodologies, and will provide superior language skills in a given period of time as compared to the skills acquired by conventional methodologies.

Another object of the invention is to provide such a method and apparatus which will enable a student to evaluate the correctness of his responses during instruction without the help of a professional.

Another object of the invention is to provide such a method and apparatus which integrates training and testing in the instructional process so that phenomena with which the student must cope during instruction are readily anticipated and unambiguous.

Another object of the invention is to provide such a method and apparatus which may be used to instruct students of any population in any target language.

Another object of the invention is to provide such a method and apparatus wherein instruction is independent of the medium in which communication occurs between the students.

Another objection of the invention is to provide such a method and apparatus wherein the length of the stimulus to which a student must respond may vary widely and still provide effective instruction.

Another object of the invention is to provide such a method and apparatus wherein the number of alternative responses may vary widely and still provide effective instruction.

Another object of the invention is to provide such a method and apparatus wherein the effectiveness of language instruction is independent of the sequence of teaching the various communication components of the language.

Another objection of the invention is to provide such a method and apparatus which is independent of the number of individuals which form a partner of a particular dyad.

Another object of the invention is to provide such a method and apparatus which affords flexibility in timing instrumentation for the introduction of new material.

These and other objects of the invention are achieved by providing a method of teaching a language to a plurality of students comprising the steps of: (a) dividing the students into a plurality of dyads of two partners each; (b) providing each partner of each dyad with one of a keyed pair of displays exhibiting items of at least one communication component; (c) commencing with a first partner of each dyad as the sayer, the sayer producing a stimulus by uttering one of said items as the sayer perceives the item; (d) proceeding to the other partner of each dyad as the responder, the responder evaluating the stimulus for identity with a comparison item on the responder's display which corresponds to the uttered item on the sayer's disply; (e) the responder then responding by indicating the responder's perception of identity of the stimulus with the comparison item in a manner which enables the sayer to identify any error in either the stimulus or the response without attributing the error to either partner and thereby evaluate the correctness of the paired stimulus and response; (f) continuously rotating the roles of the partners of each dyad as producers of stimuli, respondent to stimuli and evaluator of stimuli and responses; and (g) rotating the partners to form new dyads at predetermined intervals.

Responding to the stimulus in such a way that error is identified in either the stimulus or the response without attributing the error to either partner may be accomplished by the use of two different symbols which key the displays, one symbol designating the uttered item and one symbol designating the corresponding comparison item. If the corresponding items are identical, the symbols designating each are identical; if the items are not identical, the symbols are different. A response comprises an utterance by the responder of the symbol designating the comparison item if the stimulus is perceived to be identical to the comparison item. If the stimulus is perceived to be different from the comparison item, the response is an utterance of the symbol which is not the same as the symbol designating the comparison item.

Instruction may be conducted in one or more of the phonemic, graphemic, denotational or connotational communication components. Initially, sample items of one or more of these components may be uttered by an instructor or professional as the partners of each dyad view a corresponding sample item on their respective displays.

The invention also comprises an apparatus for teaching a language to a plurality of students arranged in dyads of two partners each comprising: (a) first display means for one partner of each dyad exhibiting an item of a communication component to be uttered as a stimulus by said one partner, as the sayer, as the sayer perceives that item; (b) second display means for the other partner of each dyad exhibiting a comparison item corresponding to the item to be uttered and with which the other partner compares the stimulus for evaluating the identity of the stimulus with the comparison item; (c) code means on said first and second display means associated with said item to be uttered and said corresponding comparison item, and forming the basis of the response by the other partner, as the responder, which response indicates the responder's perception of identity of the stimulus with the comparison item and enables the sayer to identify any error in either the stimulus or the response without attributing the error to either partner and thereby evaluate the correctness of the paired stimulus and the response.

BRIEF DESCRIPTION OF THE DRAWINGS

The novel features of the invention are set out with particularity in the appended claims, but the invention will be understood more fully and clearly from the following detailed description of a preferred embodiment of the invention as set forth in the accompanying drawings, in which:

FIGS. 1A and 1B depict a pair of keyed, printed data forms for use in phonemic instruction according to the invention;

FIGS. 2A and 2B depict a pair of keyed, printed forms for use in graphemic instruction according to the invention;

FIGS. 3A and 3B depict keyed, printed forms for use in denotational instruction according to the invention; and FIGS. 4A and 4B depict keyed, printed forms for use in connotational instruction according to the invention.

DESCRIPTION OF THE INVENTION

The method of language instruction according to the invention is initiated by dividing a plurality of students into dyads of two partners each. Each partner of each dyad is then provided with one of a keyed pair of displays bearing items of a communication component. For example, the displays illustrated in FIGS. 1A and 1B are printed forms bearing items for phonemic instruction. Other pairs of forms, such as those shown in the remaining figures, may contain items for graphemic, denotational or connotational instruction. Some forms may contain a mixture of items of several of these components. These four communication components are briefly described as follows.

Phonemic instruction involves learning the sounds of various elements of the target language by hearing them properly pronounced or by learning to pronounce given phonemic representations of the elements (for example, displayed in diacritics, or in phonetics, or in any other graphic system for representing vocal sounds). Graphemic instruction involves learning the conventional representation or spelling of elements or words in the target language. Denotational instruction involves learning the direct specific meanings of words or symbols in a target language. Connotational instruction involves learning the suggested meaning of a word or phrase in the target language from the manner in which it is used.

One partner of the dyad is given the white form of FIG. 1A (designated by a W at the upper right corner of the form), and the other partner is given the pink form (P) of FIG. 1B. This is a double-blind arrangement in that neither partner is permitted to see the form held by the other. The forms of FIGS. 1A and 1B are divided into two halves, designated "3P" and "4P." The letter "P" in these designations represents the communication component in which instruction takes place, in this instance, phonemic. The number (3 or 4) denotes the number of the form in a series of forms for phonemic instruction. Each half of each form is divided into three columns labeled "SEE," "SAY" and "RESPOND." The first ten items listed in the SEE column are viewed by the partners when their correct pronunciation is given by an instructor. The items listed in the SAY column of white form 3P are designated by certain code symbols (A or B). The corresponding items in the RE- SPOND column of the pink form 3P are also designated by these symbols. If the corresponding printed items in the SAY and RESPOND columns of these two forms are identical, they are designated by identical letters A or B. If the corresponding items are not identical, they are designated by different letters. This arrangement is used throughout the forms, and forms a basis for responses to stimuli which will identify error without attributing the error to either partner.

Instruction using the white and pink forms of FIGS. 1A and 1B commences with the instructor or a prerecorded cassette player properly pronouncing the ten prerecorded items as they appear identically in the SEE column on both partners' sheets. This typically consumes about thirty seconds. Then the Sayer, the partner whose sheet has items on the eleventh row in the SAY column, pronounces the first item in that SAY column to his partner, the Responder. If the Responder perceives that the item on his sheet in the eleventh row under RESPOND is the same as that uttered by the Sayer, the Responder notifies the Sayer of that perceived identity by uttering that letter—A or B—listed preceding that item in the RESPOND column on the Responder's sheet. If the two items on the two sheets are actually identical, then the same letter, either A or B, precedes both. If they are not actually identical, then the two preceding letters are not the same. Hence, a Responder does not know whether an item in the RESPOND column is actually the same as or not the same as that item just uttered by the Sayer. All that the Responder can know at that movement is whether or not the item as presented to that Responder is being perceived as same or not same as the utterance of the Sayer. The A or B on the Responder's sheet is merely the code which that Responder will use to signal to the Sayer what the Responder has perceived (by saying that same letter if the same and the opposite letter if not the same). The A or B uttered by the Responder has a different informational value to that Sayer. If the letter uttered by the Responder is identical to that letter preceding that item on the Sayer's sheet, this constitutes a "hit" rather than an error. A hit occurs whenever the Responder utters the same letter as that preceding the item on the Sayer's sheet that was uttered by the Sayer. When the Responder says, "A" and the Sayer has an "A" for that item, or when the Responder says, "B" and the Sayer has a "B" for that item, they together have produced a hit. Hence, the informational value to the Sayer or the Responder's uttered letter is in terms of its agreement with that letter that appears in front of that item on that Sayer's sheet.

Exchanges of stimuli and responses continue until the five items in the first Sayer's column have been completed. At that time, the partners reverse roles so that the former Sayer is now the Responder, and the former Responder is now the Sayer. Stimuli are now given by the new Sayer as he utters the items listed under the SAY column of his form (for example, the SAY column of the pink form 3P).

After approximately 10 to 12 minutes, or after a certain number of forms have been completed, all the students rotate to form new dyads consisting of different partners. This rotation will prevent the students from developing communication idiosyncrasies that are not well understood by native speakers.

The use of the forms for instruction in any of the other language components is similar. For denotational instruction, however, the forms, such as those of FIGS. 3A and 3B, do not necessarily require initial instruction by an instructor. These forms set forth in their SEE columns the precise denotation of the listed items, and give examples.

The method according to the invention does not require that a time constraint be imposed within which partners complete each form. It is desirable but not essential in terms of ultimate (post training) effectiveness, however, that a time limit not to exceed ten seconds times the number of items on the forms be imposed on any form. A shorter time limit (e.g., six seconds per item) may be imposed on students capable of reaching criteria within that briefer time limit. Hence, the educable mentally retarded may be exempted from any time constraints, while persons who will utimately use their acquired language skills professionally may work within a five second per item time constraint.

It is also desirable but not essential that a criterion be set for any form in terms of number of errors which partners make where that number being exceeded requires those partners to redo those items and a higher number being exceeded requires those partners to redo that entire form. Such redoing may occur in a post form review and rest period. For example, if there are sixteen students (eight rotating dyads) who work within an eight second per item time constraint and three to four errors must be redone, and more than five errors require redoing that whole form, then the SEE items take about thirty seconds per form and the ten words they say and respond to take eighty more seconds, for a total of one minute and fifty seconds for each form. At the end of that one minute and fifty seconds the instructor or a "say-timing" cassette can announce, "Stop. Say again each item on which a hit was not recorded if you had either three or four such items." Then an additional thirty seconds would be provided on the tape or by the instructor before it announces either, "Rotate (to form new partners)" or "Form number __."

Under such conditions, it can be seen that the time required for students to complete an entire set of forms, such as a set of fifty-eight forms for phonemes in English, is fifty-eight times two minutes and twenty seconds, or three hours and fifty-six minutes. To this must be added a few minutes for all of the partner rotations, and some five minutes of rest every ten to twelve forms. It can be seen that full mastery of English diacritics can be achieved in most students within a total of less than five hours, achieved in, say, six forty-five minute sessions.

The basic social situation, then, in communication instruction according to the invention is the "rotated peer dyad": each student communicates with each one of numerous and frequently rotated other students as a partner. Each student also rotates momentarily and continuously among the three communication roles of producer of stimuli, repondent to stimuli and evaluator of stimuli and responses. The basic mental operation is pair discrimination. The basic stimulus is one of any pair. The basic response is same or not same for the other member of that pair. In contrast, conventional language instruction methodologies utilize a fixed superordinate-subordinate dyad with the student fixed in the communication role of respondent, the basic mental operation being pair association.

Error identification in communication instruction according to the invention is simple and overt, and therefore requires no services of a professional for that purpose. An error occurs whenever a response of "A"

or "B" by a student's partner is not the same as that letter displayed to that student who produced that stimulus. The determination that an error has occurred therefore requires no services of a professional. Moreover, since phonemic and graphemic denotations and connotations are all learned at different times, the students can have no problem in determining to which of these language components an error they have made should be attributed.

The minimum number of students simultaneously involved is two, and the minimum of persons whom any student works with on a series of displays or forms should be three. Rotation to form new partners should occur approximately every ten to twelve minutes or when a certain number or forms have been completed. In this way, each student must produce stimuli in ways such that all of a moderately sized group of fellow students must respond to as they must also respond to prerecorded stimulus items uttered by professionals and/or native speakers. The development of communication idiosyncrasies is therefore precluded. Thus, the intelligibility of persons to native speakers after training is appreciable and uniform.

A stimulus item that is the same as or different from a corresponding comparison item can be virtually of any length. An entire paragraph, for example, could be said aloud with the Responder subsequently having to determine same or not same as that version printed on that Responder's sheet. Moreover the introductory material displayed in the SEE column may not only be of any length but may appear in any medium or media, since neither student partner is to respond overtly to such material.

Although in the preferred embodiment disclosed herein there is only one response for any item, with the task in that case being for the Responder to determine whether the item as displayed to the Responder is or is not the same as that uttered by the Sayer, there is no intent to limit the appended claims to that one case. The methodology is not altered or affected by having, for example, two responses presented to that Responder labeled "A" and "B", with the Responder's task in that case being to determine which of those two was uttered by the Sayer. Moreover, the Responder could be presented with two responses labeled with two of the three letters "A," "B" and "C" and instructed to respond with the nondisplayed letter if neither of those two is perceived to have been uttered by the Sayer. Similarly, the item displayed to the Responder can consist of subsidiary items, or subitems. For example, in graphemic instruction, if the Sayer says the word, "manufacture," the Responder might see (A) man (A) a (A) factor
(B) mon (B) u (B) facture and the correct coded response indicated on the Sayer's sheet would be "ABB." None of these or similar variations alter the basic pattern in which, for any item, the Sayer has no prior knowledge of what any letter or letter combination preceding that item on the Sayer's sheet refers to on the Responder's sheet, and the Responder has no prior knowledge of what letter or letter combination is displayed on that item to the Sayer.

The method according to the invention requires the displays to be used by partners, but either or both of those partners may consist of a group. The group of individuals may either have one spokesperson assigned as their Sayer, or they may rotate that function from item to item among the members of their group. And they may vote as a group of Responders to cast one ballot of "A" or "B," or they may rotate that function from item to item among the members of their group. Hence, a partner may be defined either as one person or as two or more persons who function concertedly or individually by rotation.

In the method according to the invention it is essential that some means be provided to introduce new material. Such a means may be live or prerecorded, audio only, visual only or audio-visual, and the presentation may be static or dynamic. It is desirable but not essential (as in the case of educable mental retardates) that a timing device constrain the amount of time that partners can devote to a single form or to each item. It is therefore possible for both of these instrumentations—timing and introductory material displays—to be combined within a single unit, such as an S/T (say/timing) cassette to be played in a cassette playback device. Hence, any or all of these means and devices may be used in conjunction with the essential instrumentation consisting of the data displays.

A display can be presented, for example, on cable television by different channels and pairs of learners can be formed and reformed by assigning them to pairs of unused channels. Or students can be mailed sheets and S/T cassettes and telephone numbers of partners they have been assigned to work with on certain forms, and they can work together by telephone. The instrumentation may even consist of an instructor physically present in the classroom who reads aloud the SEE items and times the students' performances with a stopwatch. It may even be possible to utilize a computer video display which displays each item to the partners of each dyad in sequence for a limited period of time.

Although the present invention has been illustrated in terms of a preferred embodiment, it will be obvious to one of ordinary skill that numerous modifications may be made without departing from the true spirit and scope of the invention which is to be limited only by the appended claims.

I claim:

1. A method of teaching a language to a plurality of students comprising the steps of:
   (a) dividing the students into a plurality of dyads of two partners each;
   (b) providing each partner of each dyad with one of a keyed pair of displays exhibiting items of at least one communication component;
   (c) commencing with a first partner of each dyad as the sayer, the sayer producing a stimulus by uttering one of said items as the sayer perceives that one item;
   (d) proceeding to the other partner of each dyad as the responder, the responder evaluating the stimulus for identity with a comparison item on the responder's display which responds to the uttered item on the sayer's display;
   (e) the responder then responding by indicating the responder's perception of identity of the stimulus with the comparison item in a manner which enables the sayer to identify any error in either the stimulus or the response without attributing said error to either partner and thereby evaluate the correctness of the paired stimulus and response;
   (f) continuously rotating the roles of the partners of each dyad as producer of stimuli, respondent to stimuli and evaluator of stimuli and responses; and (f) rotating the partners to form new dyads at predetermined intervals.

2. A method according to claim 1 wherein the items of said pair of displays are keyed by two different code symbols, one symbol designating the uttered item and one symbol designating the corresponding comparison item, said symbols being identical if said corresponding items are identical and different if said items are not identical, and the step of responding comprises the responder uttering the symbol designating the comparison item if the stimulus is perceived to be identical to the comparison item, or the responder uttering the symbol which is not the same as the symbol designating the comparison item if the stimulus is perceived to be not identical to the comparison item.

3. A method according to claim 2 wherein said communication component is selected from the group consisting of phonemic, graphemic, denotational and connotational language components.

4. A method according to claim 3 wherein said displays bear sample items of said communication component, further comprising the initial step of correctly presenting said sample items to the partners as examples while the partners view said sample items prior to the exchange of stimuli and responses.

5. A method according to claim 4 further comprising the error correction steps of again uttering an item and responding thereto if the initial response to the stimulus produced by the initial utterance of that item is not the same as the symbol designating that item.

6. A method according to claim 4 wherein the step of rotating the roles of the partners is performed whenever a predetermined number of items are completed.

7. A method according to claim 6 wherein the step of rotating the partners to form new dyads is performed whenever all of the items on said displays are completed.

8. An apparatus for teaching a language to a plurality of students arranged in dyads of two partners each comprising:
(a) first display means for one partner of each dyad exhibiting an item of a communication component to be uttered as a stimulus by said one partner, as the sayer, as the sayer perceives that item;
(b) second display means for the other partner of each dyad exhibiting a comparison item corresponding to the item to be uttered and with which the other partner compares the stimulus for evaluating the identity of the stimulus with the comparison item;
(c) code means on said first and second display means associated with said item to be uttered and said corresponding comparison item, and forming the basis of a response by the other partner, as the responder, which response indicates the responder's perception of identity of the stimulus with the comparison item and enables the sayer to identify any error in either the stimulus or the response without attributing said error to either partner and thereby evaluate the correctness of the paired stimulus and response.

9. An apparatus according to claim 8 wherein said code means comprises two different symbols, one symbol designating said item to be uttered and one symbol designating said corresponding comparison item, said symbols being identical if said items are identical and different if said items are not identical, and said response comprises an utterance by the responder of the symbol designating the comparison item if the stimulus is perceived to be identical to the comparison item, or an utterance by the responder of the symbol which is not the same as the symbol designating the comparison item if the stimulus is perceived to be not identical to the comparison item.

10. An apparatus according to claim 9 wherein said first and second display means each bears a pluraltiy of items of at least one communication component to be uttered and a plurality of comparison items, whereby the partners of each dyad can rotate their roles of producer of stimuli, respondent to stimuli and evaluator of stimuli and responses.

11. An apparatus according to claim 10 wherein said communication component is selected from the group consisting of phonemic, graphemic, denotational and connotational language components.

12. An apparatus according to claim 11 wherein said first and second display means further comprise sample items of said communication component which are to be correctly presented to and viewed by the partners as examples prior the exchange of stimuli and responses.

13. An apparatus according to claim 11 or 12 wherein said first and second display means comprise printed forms.

* * * * *